United States Patent Office 3,035,102
Patented May 15, 1962

3,035,102
HALOBUTENYLCYCLOPENTENES
Erich Marcus, Charleston, W. Va., assignor to Union Carbide Corporation, a corporation of New York
No Drawing. Filed June 7, 1960, Ser. No. 34,392
5 Claims. (Cl. 260—648)

This invention relates to novel halobutenylcyclopentenes and a method of preparing them.

More specifically, the object of this invention is to provide novel compounds by reacting a 1,3-butadiene with a 3-halocyclopentene.

The reaction of preparing these novel compounds can be illustrated by the following equation:

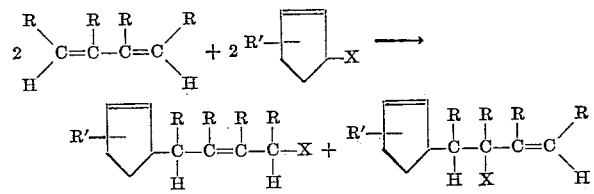

in which each R individually is hydrogen, an alkyl group having from 1–8 carbon atoms, bromine, chlorine, fluorine or iodine, R' is hydrogen or an alkyl group having from 1–8 carbon atoms and X is chlorine or bromine.

The reaction is conducted in the presence of a Friedel-Crafts catalyst such as zinc chloride, zinc bromide, titanium tetrachloride, stannic chloride, boron trifluoride etc. The amount of catalyst is not narrowly critical and varies over a considerable range. The preferred range is from about 5 to 10% by weight, based on the amount of diene employed.

The temperature at which the reaction is conducted is in the range of about $-50$ to $+50°$ C. The preferred range is from $-30$ to $+10°$ C.

The proportion of reactants is also not critical and an excess of either reactant can be used. However, for economical considerations, a 1:1 molar ratio is preferred. It is also preferred to gradually add one reactant to the other reactant or to mix small portions of both reactants at one time since the progress of the reaction can best be controlled in this manner.

A solvent is not necessary in the instant process, although the reaction will proceed very satisfactorily in the presence of an inert solvent.

It is also desirable to use a polymerization inhibitor to prevent the polymerization of the diene. Any conventional inhibitor can be employed as these are well known in the art and form no part of this invention. An example of an inhibitor is hydroquinone. It is pointed out that although the presence of an inhibitor is desirable, it is not absolutely necessary.

Examples of the halocyclopentenes which can be used as starting materials in the process of this invention include 3-chlorocyclopentene and 3-bromocyclopentene.

Specific 1,3 dienes which can be used include butadiene; 2-chloro-3-methylbutadiene; isoprene; 2,3-dimethylbutadiene; chloroprene; fluoroprene; iodoprene; 2,3-dichlorobutadiene; 2,3-dibutylbutadiene; 2,3-dipropylbutadiene; 2-bromo-1,3-pentadiene; 2-iodo-1,3-hexadiene; etc.

The novel halobutenylcyclopentenes include: 3-(4-chloro-2-butenyl)cyclopentene; 3-(2-chloro-3-butenyl)cyclopentene; 3-(4-bromo-2-butenyl)cyclopentene; 3-(2-bromo-3-butenyl)cyclopentene; 3-(2-bromo-4-chloro-2-butenyl)cyclopentene; 3 - (2 - fluoro - 4 - chloro - 2 - butenyl)cyclopentene; 3 - (2,4 - dichloro - 2 - butenyl)cyclopentene; 3 - (4 - chloro - 2 - methyl - 2 - butenyl)cyclopentene; 3 - (4 - chloro - 2 - iodo - 2 - butenyl)cyclopentene; etc.

The novel halobutenylcyclopentenes of this invention are interesting intermediates for the preparation of novel alcohols, ethers, nitriles, carboxylic acids, thiocyanates, etc. Also these novel compounds can be epoxidized by treatment with peracetic acid to yield diepoxides which can be used either as reactive diluents to reduce the viscosities of epoxy resins or as stabilizers for vinyl halide resins, such as polyvinyl chloride.

EXAMPLE 1

3-(4-Chloro-2-Butenyl)Cyclopentene and 3-(2-Chloro-3-Butenyl)Cyclopentene

Butadiene (432 g., 8 moles) was introduced with stirring during a period of two and three-quarter hours into a mixture of 821 g. (8 moles) of 3-chlorocyclopentene, 24 g. of fused and pulverized zinc chloride, and 1 g. of hydroquinone. During this time the reaction temperature was maintained between $-10$ and $-15°$ C. The reaction mixture was stirred for another fifteen minutes, while the temperature was allowed to rise to $0°$. After addition of 400 ml. of ice water the product was left standing overnight. The organic layer was separated, diluted with petroleum ether, B.P. 65–67°, washed again with water, dried over calcium chloride, and filtered. Distillation without rectification afforded 604 g. (48 percent yield), B.P. 55°/10 mm.–88°/3 mm., $n$ 30.5/D 1.4890, of chlorobutenylcyclopentenes. Redistillation through a 23″ long column showed that 566 g. had a distillation range of 44°/1.1 mm.–56.5°/1.4 mm.

An analytical sample, which was obtained from another run, had the following physical properties: B.P. 40°/0.2 mm.–46°/0.5 mm., $n$ 20/D 1.4928, $d^{20}$ 1.000.

Analysis.—Calcd. for $C_9H_{13}Cl$: C, 69.00; H, 8.36; Cl, 22.63; $M_D$, 45.50; M.W., 156.65. Found: C, 68.95; H, 8.23; Cl, 22.35; $M_D$, 45.51; mass of heaviest major fragments (mass spectrometer), 156, 158.

Pure 3-(2-chloro-3-butenyl)cyclopentene (I) and 3-(4-chloro-2-butenyl)cyclopentene (II) obtained by fractional distillation through a 3′ long column had the following physical properties: Compound I, B.P. 47–48°/1.4 mm., $n$ 20/D 1.4841, $d^{20}$ 0.982; compound II, B.P. 55–56.5°/1.4 mm., $n$ 20/D 1.4978, $d^{20}$ 1.017. The infrared spectra are in agreement with the proposed structures.

EXAMPLE 2

3-(4-Chloro-2-Butenyl)Cyclopentene and 3-(2-Chloro-3-Butenyl)Cyclopentene 3-chlorocyclopentene (102.5 g., 1 mole) was added with stirring during a period of one and three-quarter hours to a mixture of 54 g. (1 mole) of butadiene, 4 g. of pulverized zinc chloride, and 0.2 g. of hydroquinone. During this time the reaction temperature was maintained between $-22$ and $-25°$ C. The reaction mixture was stirred for another two and one-quarter hours at $-20$ to $-25°$ C. After addition of 100 ml. of water the temperature of the reaction mixture was allowed to rise to $0°$ during a period of ten minutes. The organic layer was separated, diluted with petroleum ether, washed twice with 10 percent sodium hydroxide solution, again with water, dried over calcium chloride, and filtered. The product was distilled without rectification and then through a 10″ long column to give 81 g. (52 percent yield), B.P. 42°/0.6 mm.–60°/1 mm., of chlorobutenylcyclopentenes.

When one mole of chlorocyclopentene was added to five moles of butadiene and the reaction was run in a similar fashion, the yield of chlorobutenylcyclopentenes was 59 percent after redistillation.

EXAMPLE 3

3-(2,4-Dichloro-2-Butenyl)Cyclopentene

Chlorocyclopentene (155 g., 1.5 moles) was added with stirring during a period of one and one-quarter hours to a mixture of 266 g. (3.0 moles) of chloroprene, 6 g. of pulverized zinc chloride, and 0.5 g. of phenothiazine. During this time the reaction temperature was maintained between −20 and −15° C. The reaction mixture was stirred for another hour and thirty-five minutes at −15° C. After addition of 100 ml. of ice water the reaction mixture was allowed to rise to 0° during a period of five minutes. Petroleum ether (300 ml.) was added, and the organic layer was separated. The oil was again washed with ice water, dried over calcium chloride, filtered, and distilled without rectification to give 191.5 g. of product, B.P. 60°/2 mm.–115°/1.5 mm. Redistillation through a 10″ column gave 180 g. (61 percent yield) of dichlorobutenylcyclopentenes, B.P. 55°/0.35 mm.–65°/0.3 mm.

A fraction boiling at 62–64°/0.3 mm. was analyzed, $n_D^{20}$ 1.5149, $d^{20}$ 1.143.

*Analysis.*—Calcd. for $C_9H_{12}Cl_2$: C, 56.58; H, 6.33; Cl, 37.09; $M_D$, 50.36; M.W. 191.1. Found: C, 56.87; H, 6.46; Cl, 36.86; $M_D$, 50.41; mass of heaviest major fragments (mass spectrometer), 190, 192.

Gas chromatography showed the presence of three isomers in approximately 80, 15, and 5 percent amounts. On the basis of its infrared spectrum the major fraction must be the 1,4-adduct, which is 3-(2,4-dichloro-2-butenyl)cyclopentene.

EXAMPLE 4

*3-(4-Chloro-2-Methyl-2-Butenyl)Cyclopentene*

Isoprene (68 g., 1 mole) was added with stirring during a period of one hour and twenty minutes to a mixture of 102.5 g. (1 mole) of 3-chlorocyclopentene, 4 g. of pulverized zinc chloride, and 0.5 g. of hydroquinone. During this time the reaction temperature was maintained between −15 and −25° C. The mixture was stirred for another hour and twenty-five minutes at about −20° C. After addition of 100 ml. of benzene and 100 ml. of ice water the temperature of the reaction mixture was allowed to rise to 0°. The organic layer was separated, washed with 10 percent sodium hydroxide solution, twice with water, dried over sodium sulfate, filtered, and distilled without rectification to give 62 g. (36 percent yield) of crude product, B.P. 80°/1 mm.–120°/3 mm. Redistillation through a spiral wire column afforded an analytical sample, B.P., 55°/0.3 mm.–53°/0.27 mm., $n_D^{20}$ 1.4989, $d^{20}$ 1.001.

*Analysis.*—Calcd. for $C_{10}H_{15}Cl$: C, 70.37; H, 8.86; Cl, 20.77; $M_D$, 50.12; M.W. 170.68. Found: C, 70.40; H, 8.79; Cl, 21.33; $M_D$, 50.06; mass of heaviest major fragments, 170, 172.

Evidence based on the infrared spectrum indicated it was mainly a 1,4-adduct. The structure is 3-(4-chloro-2-methyl-2-butenyl)cyclopentene.

I claim:

1. Halobutenylcyclopentenes corresponding to the formulas selected from the group consisting of

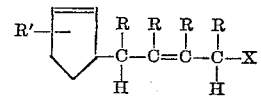

and

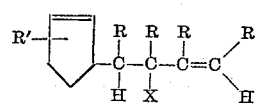

where each R is selected from the group consisting of hydrogen, alkyl groups containing from 1 to 8 carbon atoms, chlorine, fluorine, bromine and iodine; R′ is selected from the group consisting of hydrogen and alkyl groups containing from 1 to 8 carbon atoms; and where X is selected from the group consisting of chlorine and bromine.

2. 3-(4-chloro-2-butenyl)cyclopentene.
3. 3-(2-chloro-3-butenyl)cyclopentene.
4. 3-(2,4-dichloro-2-butenyl)cyclopentene.
5. 3-(4-chloro-2-methyl-2-butenyl)cyclopentene.

References Cited in the file of this patent

UNITED STATES PATENTS

| | | |
|---|---|---|
| 2,551,639 | Feasley et al. | May 8, 1951 |
| 2,689,873 | Niederhauser | Sept. 21, 1954 |
| 2,981,755 | Wiese | Apr. 25, 1961 |